April 25, 1961 W. P. MASON 2,981,905

ELECTROMECHANICAL WAVE FILTER

Filed Aug. 20, 1958

INVENTOR
W. P. MASON
BY H. O. Wright
ATTORNEY

United States Patent Office 2,981,905

Patented Apr. 25, 1961

2,981,905

ELECTROMECHANICAL WAVE FILTER

Warren P. Mason, West Orange, N.J., assignor to Bell Telephone Laboratories, Incorporated, New York, N.Y., a corporation of New York Filed Aug. 20, 1958, Ser. No. 756,113

3 Claims. (Cl. 333—71)

This invention relates to electromechanical band pass wave filters. More particularly it relates to electromechanical filters employing a plurality of plate type mass elements vibrating in a flexural mode.

My companion copending application Serial No. 756,181, filed August 20, 1958, concurrently with the present application, is directed to a related type of filter in which cylindrical type mass elements vibrating in a balanced torsional mode about their respective central transverse planes as nodal planes are employed instead of the flexurally vibrating plate mass elements of the structures of the present application.

While electromechanical filters of the type employing flexurally vibrating plate mass elements have been found very useful for particular purposes, the prior art filters of this type have required the use of a large number of mechanical elements to obtain sufficient discrimination against interference by frequencies not included within the band of frequencies which the filter is designed to transmit.

The prior art filters of this type are consequently expensive not only on account of the increased cost of the large number of elements required but more especially since the adjustment of the large number of elements required is time-consuming and requires a high degree of skill.

Accordingly, a principal object of the invention is to reduce the number of elements required in filters of the above indicated type.

A further object is to simplify the filters and reduce the cost of manufacturing and adjusting them.

In accordance with the principles of the present invention, these and other objects and advantages are achieved by modifying the coupling members employed in the mechanical portion of the filter so that substantially increased discrimination against frequencies outside of the pass-band is provided by each component section of the filter.

The above and other objects, advantages and features of the invention will be apparent from a perusal of the appended claims and the detailed description hereinunder of an illustrative embodiment of the invention illustrated in the accompanying drawing in which:

Figure 1:
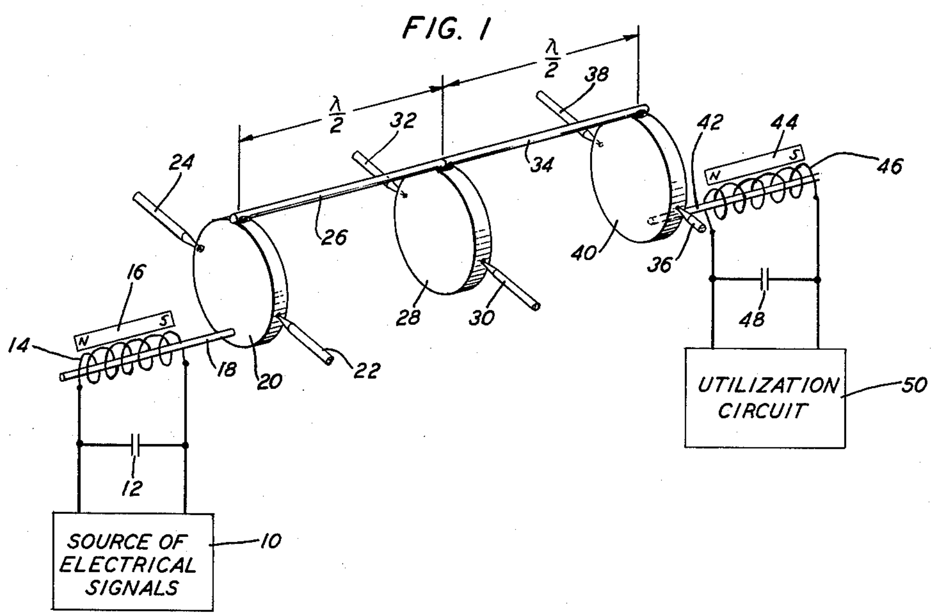
Fig. 1 represents a specific embodiment of the invention.

In more detail in Fig. 1, a band pass electromechanical filter is illustrated diagrammatically and comprises three discs 20, 28 and 40 of resilient material which may be, for example, brass, steel, ceramic, glass, or the like. The discs are supported for flexural vibration about their respective horizontal diameters by pivots 22, 24; 30, 32 and 36, 38, respectively, as shown. The discs are located along a common horizontal axis passing through their respective center points. The major surfaces of the discs are normal to the common axis. Rod 26 interconnects a point on the upper end of the vertical diameter of disc 20 with the corresponding point on disc 28. Similarly, rod 34 interconnects a point on the upper end of the vertical diameter of disc 28 with the corresponding point on disc 40. Rods 26 and 34 are made one-half wavelength long of the mid-band frequency of the pass-band of the filter.

Disc 20 is driven in flexural vibration about its horizontal diameter by a magnetostrictive transducer comprising magnetostrictive rod 18, passing through electrical coil 14, the length of the rod passing through coil 14 being magnetized by permanent magnet 16. Rod 18 connects to disc 20 at a point on its vertical diameter well below its horizontal diameter as shown in Fig. 1.

A capacitor 12 is shunted across coil 14 to broaden the frequency response of the transducer in accordance with principles well known and widely employed by those skilled in the electromechanical transducer art.

Electrical signals are provided by the source 10 and cause rod 18 to vibrate longitudinally in accordance with the signals.

Assuming frequencies within the pass-band of the filter are being supplied from source 10, rod 26 transmits the flexural vibration of disc 20 to disc 28, the latter vibrating about its supporting pivots 30, 32 which are situated at the ends of its horizontal diameter as mentioned above. Likewise, rod 34 transmits the vibration of disc 28 to disc 40, the latter also vibrating about its horizontal diameter as supported by pivots 36 and 38.

A second magnetostrictive transducer comprising rod 42 of magnetostrictive material passing through coil 46 and magnetized by permanent magnet 44 is driven by disc 40. Rod 42 at its left end is connected to a point on disc 40 well below its horizontal diameter as shown. Capacitor 48 is shunted across coil 46 to broaden its frequency response, as for the input transducer.

Rods 18, 26, 34 and 42 should be of resilient material and of appropriate cross-sectional area and shape that they vibrate longitudinally and not flexurally. Round rods of appropriate diameter to impart stiffness with respect to flexural vibrations have proven satisfactory. Rods 18 and 42 are, of course, of magnetostrictive material. Rods 26 and 34 may be, for example, of brass, steel, ceramic, glass, or the like.

Utilization circuit 50 is connected across the parallel combination of coil 46 and capacitor 48 as shown and utilizes the electrical signals generated by the output transducer in response to the vibratory motion of disc 40 as transmitted through the sequence of rods and discs as just described in detail above.

Numerous and varied modifications can readily be made in the filter structure just described without materially changing its essential features and principles of operation. For example, the discs can be replaced by plates or bars of various shapes having known modes of flexural vibration and piezoelectric transducers can be used in place of the magnetostrictive transducers in accordance with principles well known and widely used by those skilled in the art. Also, the driving points on the various consecutive vibrating members can be rearranged to provide somewhat differing degrees of coupling between successive discs or between either transducer and the disc with which it is directly connected in accordance with principles well known and widely used by those skilled in the electromechanical wave filter art.

Figure 2:
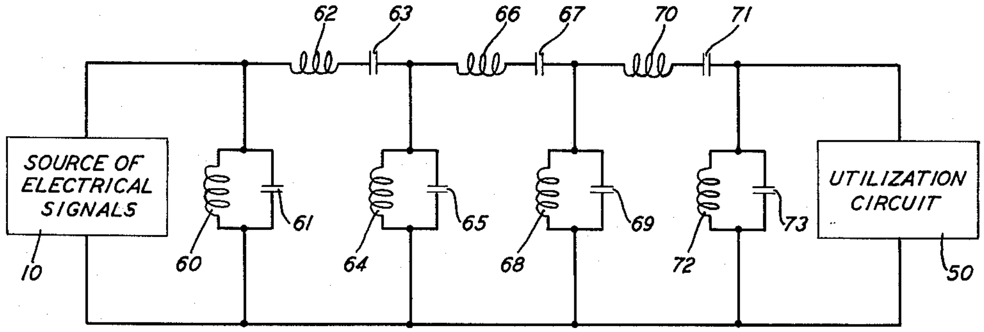
Fig. 2 is an electrical schematic diagram representing the equivalent electrical circuit of the structure of Fig. 1.

In Fig. 2 an electrical schematic diagram is shown which represents the equivalent all-electrical circuit of the electromechanical arrangement illustrated in Fig. 1.

In Fig. 2 the shunt parallel combination of inductance 60 and capacitor 61 represents the combination of the input transducer and its associated electrical capacitor 12.

The series combination of inductance 62 and capacitor 63 represents the disc 20.

The shunt parallel combination 64, 65 represents the coupling rod 26.

The series combination 66, 67 represents the disc 28.

The shunt parallel combination 68, 69 represents the coupling rod 34.

The series combination 70, 71 represents the disc 40.

The shunt combination 72, 73 represents the combination of the output transducer and its associated electrical capacitor 48.

All of the above combinations are resonant (series or parallel, respectively, for the series and parallel combinations) at the mid-frequency of the pass-band of the filter.

As is well known to those skilled in the electrical wave filter art, a band pass filter comprising shunt parallel resonant arms alternating with series arms which are series resonant, all being resonant at the mid-frequency of the pass-band of the filter, is a "confluent" type of filter. (See "Transmission Networks and Wave Filters," by T. E. Shea, page 233, published by D. Van Nostrand Co., New York 1929, and Patent 1,227,113, granted May 22, 1917, to G. A. Campbell, page 3, line 92, through page 4, line 3, and page 4, lines 94 through 99.)

Such a filter, as is well known to those skilled in the art, has more than twice as much attenuation throughout its attenuating regions per filter section as prior art mechanical filters in which the coupling rods are much less than one-half wavelength long of the mid-frequency of the pass-band of the filter. The shorter rods are electrically represented, of course, by a simple capacitor. Accordingly, filters of the present invention require less than half of the number of elements of a corresponding prior art filter of the same general type to afford the same discrimination against frequencies not within the pass-band of frequencies which the filter is designed to segregate from all other frequencies.

Numerous and varied other arrangements and modifications will readily occur to those skilled in the art which are clearly within the spirit and scope of the principles of the present invention as exemplified hereinabove. No attempt has here been made to illustrate all possible varied forms which the invention may take.

What is claimed is:

1. In a band pass electromechanical wave filter a first plane resilient member, the first member having a first axis and a second axis about both of which the member is symmetrically disposed, the second axis being normal to the first axis, the first member being supported by fixed supporting members for flexural vibration about the said first axis of symmetry of the first member, a second plane resilient member, the second member having a first axis and a second axis about both of which the member is symmetrically disposed, the second axis being normal to the first axis, the second member being supported by fixed supporting members for flexural vibration about the said first axis of symmetry of the second member, the first and second members being supported in parallel planes, their respective first axes of symmetry being parallel to each other, longitudinal vibration transmitting means comprising a rod of resilient material of cross-sectional area and shape tending to preclude flexural vibration in the rod, the rod having a length of one-half wavelength of the mid-frequency of the pass-band and connecting a point on the second axis of the first member remote from its first axis of symmetry with a similar point of the second member, the first and second members resonating in flexural vibration about their respective first axes of symmetry at the mid-frequency of the pass-band of the filter.

2. A band pass electromechanical wave filter comprising a plurality of like plane members aligned in parallel planes at regular intervals, the like plane members each having a first axis and a second axis about both of which axes it is symmetrically disposed, the axes of symmetry of each member being perpendicular to each other, the corresponding axes of the like plane members being parallel to each other, each of the like plane members being supported by fixed supporting members for flexural vibration about their respective first axes of symmetry, successive members being coupled by a rod, each rod extending from a point on the second axis of symmetry displaced from the first axis of symmetry of one member to the corresponding point on the next successive member, the rods each having a length of one-half wave length of mid-frequency of the pass-band of the filter, the like plane members each being resonant in flexural vibration about its first axis of symmetry at the mid-frequency of the pass-band of the filter, means responsive to electrical signals for generating corresponding flexural vibrations in one end member of the plurality of like plane members, the means being connected to a point on the second axis of symmetry of the member remote from its first axis of symmetry, and means responsive to flexural vibrations of the other end member of the plurality of like plane members, the means being connected to a point on the second axis of symmetry of the member remote from its first axis of symmetry for generating corresponding electrical signals.

3. In an electromechanical band pass wave filter, the combination comprising a pair of discs spaced along a common axis with the major faces of one parallel to those of the other, fixed supporting means supporting each disc for flexural vibration about a diameter, the supported diameters of the respective discs being parallel to each other, means for flexurally vibrating one of the discs about its supported diameter, and means comprising a wire one-half wavelength of the mid-frequency of the pass-band of the filter in length interconnecting a point on the diameter normal to the supported diameter of one disc and displaced from the supported diameter of the one disc to a corresponding point on the other disc.

References Cited in the file of this patent

UNITED STATES PATENTS

| | | |
|---|---|---|
| 1,227,114 | Campbell | May 22, 1917 |
| 2,615,981 | Doelz | Oct. 28, 1952 |
| 2,617,882 | Roberts | Nov. 11, 1952 |
| 2,717,361 | Doelz | Sept. 6, 1955 |
| 2,856,588 | Burns | Oct. 14, 1958 |